March 9, 1948. N. J. SCHUSTER 2,437,273
DRAINAGE DITCH EQUIPMENT
Filed Feb. 28, 1945 2 Sheets-Sheet 2
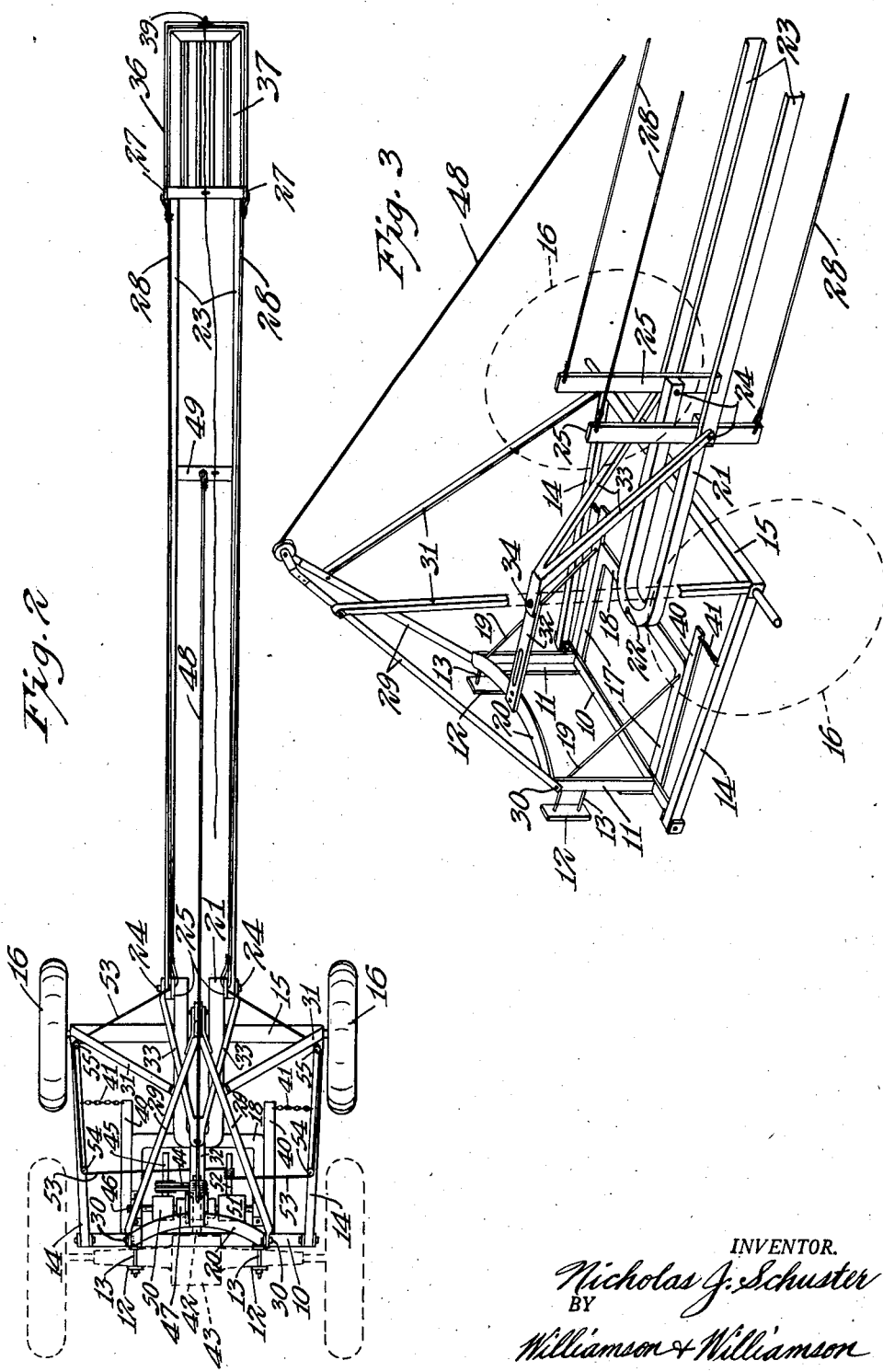
INVENTOR.
Nicholas J. Schuster
BY
Williamson & Williamson
ATTORNEYS Patented Mar. 9, 1948

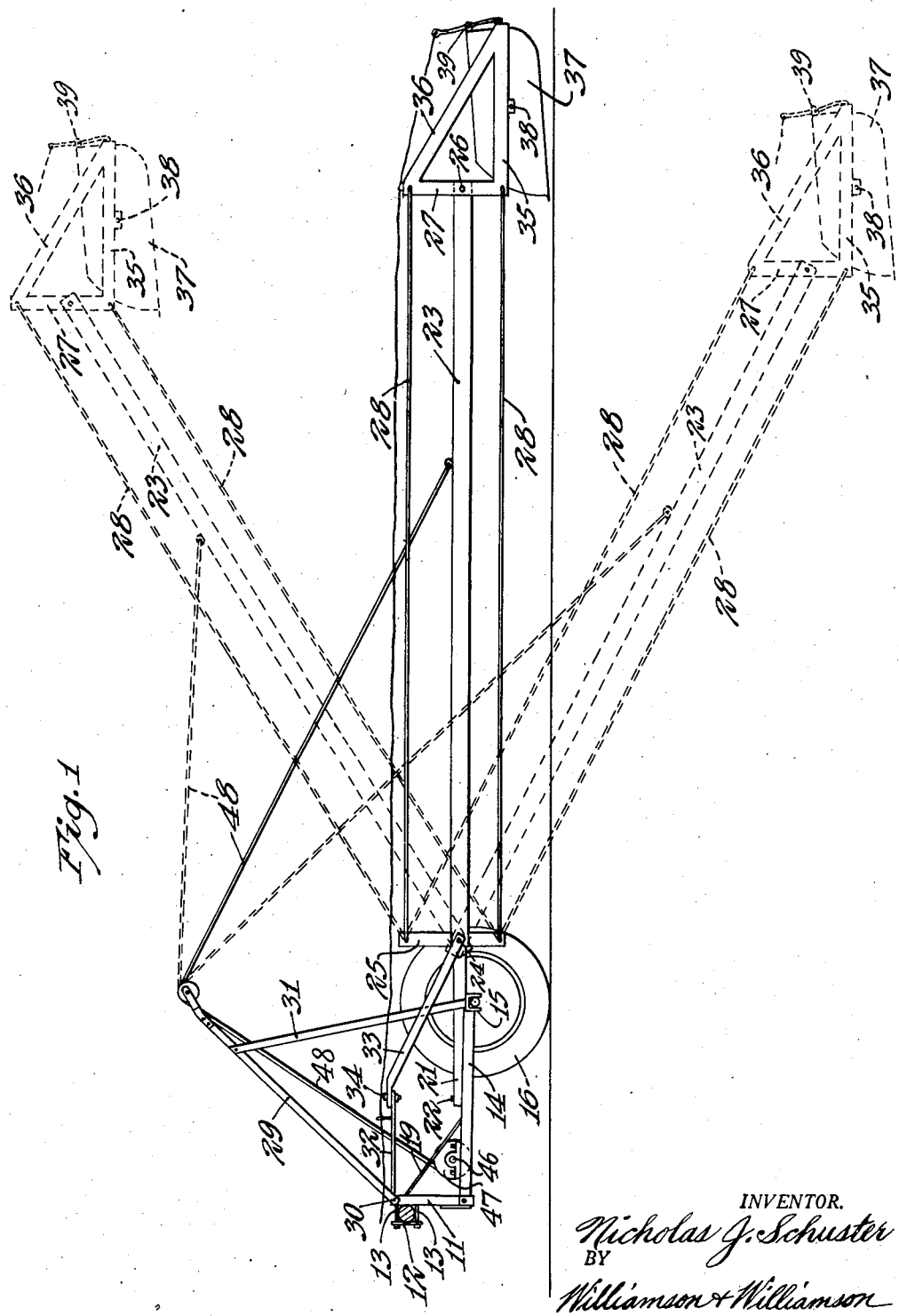

2,437,273

UNITED STATES PATENT OFFICE 2,437,273

DRAINAGE DITCH EQUIPMENT

Nicholas J. Schuster, Easton, Minn.

Application February 28, 1945, Serial No. 580,115

3 Claims. (Cl. 212—59)

This invention relates to earth moving implements and more particularly to apparatus for digging ditches such as drainage ditches.

It is an object of the invention to provide a device which is adapted to be connected to a tractor and which includes an elongated boom having an excavating bucket thereon wherein means is provided for supporting a considerable portion of the weight of the boom and the bucket with its load independently of the tractor.

Another object of the invention is to provide apparatus of the type mentioned above wherein boom elevating and horizontal shifting means is included and is so related to the tractor connection and the boom that said boom can be shifted horizontally and vertically relative to the tractor and the tractor connection.

A further object of the invention is to provide apparatus shiftable in the above described manner in combination with means for maintaining the excavating bucket or other implement in a proper load carrying position during elevation of the boom and regardless of relative positions of the boom and the tractor to which it is connected.

These and other objects and advantages of the invention will more fully appear from the following description made in connection with the accompanying drawings, wherein like reference characters refer to the same parts throughout the views, and, in which:

Fig. 1 is a side elevation of the apparatus;

Figure 2 is a plan view thereof; and

Figure 3 is a perspective view of the forward end of the device.

The apparatus includes a cross bar 10 having a pair of uprights 11 extending vertically therefrom. Each upright 11 adjacent its upper end is provided with a clamping unit 12 by means of which the uprights can be connected to a suitable part of the tractor such as the rear axle housing 13 shown in Figures 1 and 2. The cross member 10 extends beyond the uprights 11 and has an undercarriage arm 14 pivotally connected to each end and extending rearwardly therefrom. The rear ends of the arms 14 are connected by an axle 15 upon which are mounted wheels 16.

Extending rearwardly from the cross member 10 is a pair of spaced arms 17 which are connected at their rear ends to a cross member 18. Braces 19 connect the upper ends of the uprights 11 with the rear ends of the arms 17. An upper cross member 20 connects the upper ends of the uprights 11.

A U-shaped yoke 21 has its bridge portion connected to the cross member 18 by a vertical pivot 22 and has its legs extending rearwardly. To the rear end of each leg of the yoke 21 is connected a boom arm 23 by means of horizontal pivots 24. A pair of uprights 25 are connected rigidly to the end portions of the yoke 21 and extend above and below said yoke. The boom arms 23 extend rearwardly a considerable distance and are connected in spaced relation by a cross bar 26. A pair of rear uprights 27 are mounted on the cross bar 26 and adapted to pivot relative to the boom arms 23. Stabilizer rods or cables 28 are connected between the upper ends of the forward boom uprights 25 and the rear boom uprights 27 on respective sides of the boom assembly.

Extending diagonally upwardly and rearwardly from the upper ends of the frame uprights 11 are converging members 29 which are pivotally connected to said frame uprights 11 by horizontal pivots 30. Braces 31 extend downwardly from the members 29 to the rear ends of the undercarriage arms 14.

A strap 32 extends rearwardly from the center of the cross member 20 which connects the upper ends of the frame uprights 11. A pair of converging bracing arms 33 extend from a vertical pivotal connection with the rear end of the strap 32 to the rear ends of the horizontal shiftable yoke 21.

Extending rearwardly from the lower ends of the rear boom uprights 27 is a U-shaped bucket frame 35 and braces 36 extend from the rear side portions of the frame 35 to the upper ends of the rear boom uprights 27. An excavating bucket 37 is pivotally mounted at 38 to the U-shaped bucket frame 35, and said bucket is adapted to be dumped by any suitable means such as a cable 39 connected to the rear end of the bucket. The cable, of course, leads forwardly to the tractor so that it can be pulled by the operator thereof.

Extending rearwardly from the main cross member 10 and inside of the under carriage arms 14 are spaced bars 40 which are connected at their rear ends to the arms 14 by means of chains 41.

A tractor power takeoff shaft 42 extends rearwardly from the tractor differential 43 and is connected by belts 44 to a transmission shaft 45 which is suitably supported by the connector frame 17, 18. A cross shaft 46 extends between the connector frame arms or members 17 and carries a drum or reel 47 upon which is wound a cable 48 which in turn is connected to a spacer 49 mounted between the boom arms 23. A combined clutch and brake mechanism 50 connects the shafts 45 and 46 and a similar mechanism 51 connects the cross shaft 46 with a shaft 52 which is supported by the connector frame unit 17, 18 and also the main cross member 19. A cable 53 has a few turns thereof wound about the shaft 52. The cable extends about pulleys 54 and 55 on the under carriage arms 14 and the ends of the cable 53 are connected to the forward ends of the boom arms 23. The details of the power shafts and transmission and braking mechanisms are not shown since they are more or less conventional. However, it will be understood that the transmission mechanisms 50 and 51 can be independently controlled so that the drum 47 and the cable shaft 52 can be selectively operated. Rotation of the drum 47 will cause the boom assembly to raise or lower and rotation of the shaft 52 will swing the boom in a horizontal plane to the right or left.

With apparatus such as shown and described it is possible to effectively dig a trench or ditch. When the unit is moved forwardly with the bucket 37 in a dirt gathering position the bucket can be filled and the boom which supports the bucket can then be elevated and swung to either side to permit dumping of the dirt conveniently at one or both sides of the ditch line.

The under carriage including the arms 14, axle 15 and wheels 16 supports the braces 31 and converging members 29 which carry the cable 48 and consequently support most of the weight of the boom assembly and bucket. Therefore, when the tractor is moving over the ground and there is a change in ground contour the under carriage supported by the wheels 16 can absorb the weight of the boom assembly and thus relieve the strain on the connections between the boom and the tractor. The brace members 33 and strap 32 act as strengthening and stabilizing means for the boom yoke 21 and it will be noted that the shaft 34 connecting the braces 33 to the strap 32 and the pivot 22 of the boom yoke 21 are in vertical alignment to permit free horizontal swinging movement of the boom assembly.

It will, of course, be understood that various changes may be made in the form, details, arrangement and proportions of the various parts without departing from the scope of my invention.

What I claim is:

1. In a device of the class described, a relatively stationary frame having means for attaching the same to a tractor or the like, an elongated boom connected to said frame for vertical and horizontal movement relative thereto, boom elevating means connected to said frame for movement vertically relative thereto, an under carriage connected to said frame for movement vertically relative thereto, and a supporting connection between said under carriage and said boom elevating means.

2. The structure in claim 1 and a power connection between said frame and said boom operable to shift said boom horizontally, and said power connection being flexible to permit vertical movement of said boom relative to said frame.

3. In a device of the class described, a frame, means for attaching said frame to a tractor or the like, a boom connected to said frame for vertical and horizontal movement relative thereto, a wheeled under carriage connected to said frame and movable vertically relative thereto, a power device extending above the connection between said boom and said frame, said power device being supported by said frame and said under carriage and being movable relative to said frame, and a second power device supported by said frame and having connections with said boom to shift the same horizontally, and the connection between said second power device and said boom being flexible to permit vertical shifting movement of said boom relative to said power device.

NICHOLAS J. SCHUSTER.

REFERENCES CITED

The following references are of record in the file of this patent:

UNITED STATES PATENTS

| Number | Name | Date |
|---|---|---|
| 1,777,907 | Bearland | Oct. 7, 1930 |
| 2,126,597 | Zeilman | Aug. 9, 1938 |
| 2,183,263 | Le Tourneau | Dec. 12, 1939 |
| 2,341,007 | Woomer | Feb. 8, 1944 |

FOREIGN PATENTS

| Number | Country | Date |
|---|---|---|
| 427,292 | Germany | Mar. 31, 1926 |